Nov. 13, 1962     J. MALOY     3,063,802
PROCESS FOR THE PRODUCTION OF DI-AMMONIUM PHOSPHATE
Filed Aug. 2, 1960     3 Sheets-Sheet 1

INVENTOR.
JOHN MALOY
BY Fred P. Kostka
his ATTORNEY

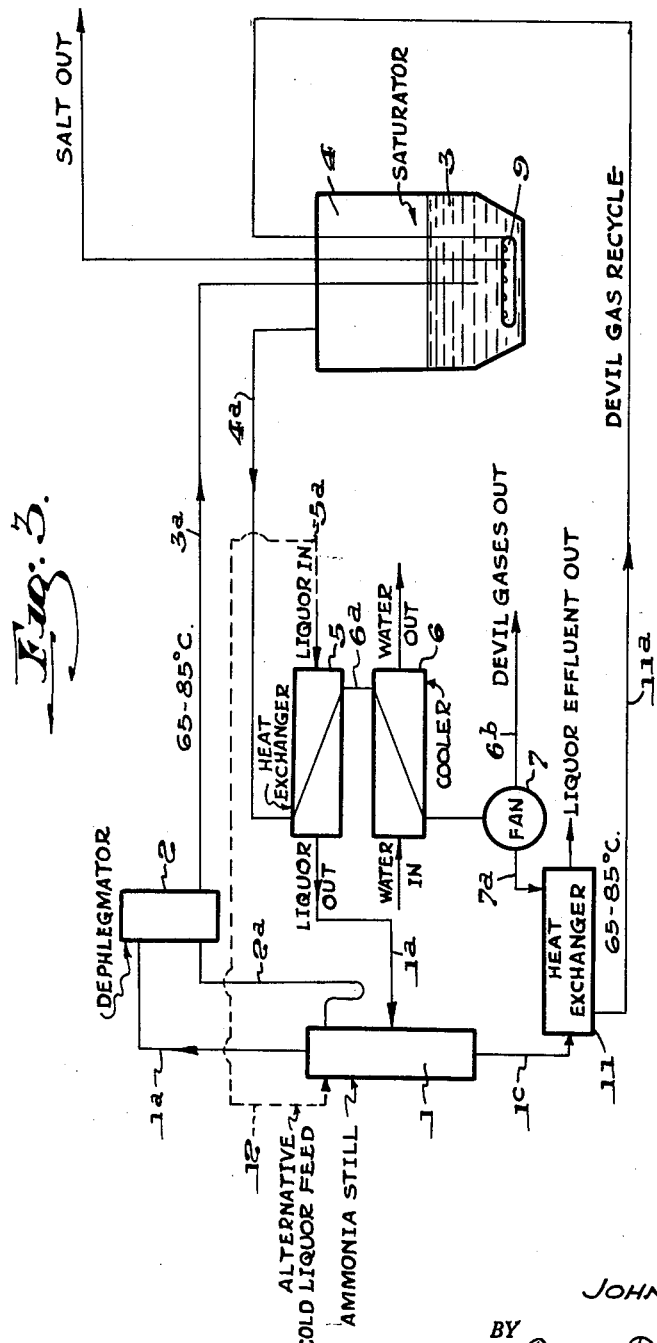

United States Patent Office 3,063,802
Patented Nov. 13, 1962

3,063,802
PROCESS FOR THE PRODUCTION OF DI-AMMONIUM PHOSPHATE
John Maloy, London, England, assignor to Woodall-Duckham Construction Company Limited, London, England, a British company
Filed Aug. 2, 1960, Ser. No. 46,996
5 Claims. (Cl. 23—107)

This invention concerns a new or improved process for the production of ammonia salts of phosphoric acid and especially mono- and di-ammonium phosphates.

An object of the invention is to provide an efficient process for the production of such salts using ammonia gas produced by an indirect ammonia recovery process from ammoniacal condensates or liquor hereinafter called "liquor" recovered as by-products from coke oven gas evolved from the carbonizing of coal.

This invention also covers ammonium salts of phosphoric acid when produced using the process of the invention.

According to one aspect of the invention, there is provided a process for producing ammonium salts of phosphoric acid, and particularly mono- and di-ammonium phosphate, from ammoniacal liquor, such process comprising distilling ammonia from the liquor; passing the ammonia containing vapors at a temperature appropriate for the production of the required salt, such temperature hereinafter being called the "reaction" temperature, into a phosphoric acid bath maintained at the reaction temperature; withdrawing the devil gases, air and water vapor arising from said bath; cooling these gases to condense out at least part of the said water vapor, reheating at least a portion of the cooled gases to about the reaction temperature; and recycling the reheated portion of such gases through the said phosphoric acid bath to evaporate excess water therefrom. The term "devil gas" as used above and hereinafter comprise hydrogen sulphide, hydrocyanic gas, and carbon dioxide originally contained in the ammoniacal liquor, water vapor, and air.

In using ammonia gas produced by an indirect recovery process as above described, the quantity of water in the phosphoric acid bath tends to increase and recycling a suitable proportion of the devil gases serves to remove this excess water and to maintain a satisfactory working level.

The reheated devil gases are bubbled through the said acid bath and the temperature at which they are recycled to the bath is determined in accordance with the salt it is primarily intended to produce.

The vapors passing from the still to the said phosphoric acid bath may be appropriately cooled on their way to such bath.

The invention is more especially concerned with the production of di-ammonium phosphate, and according to a further aspect, such phosphate is produced by distilling the ammoniacal liquor in an ammonia still as in the normal indirect ammonia recovery processes, cooling the gas thus produced from the still temperature which is usually somewhat above 100° C., for example 105° C., to a temperature, e.g., in the region of about 65° C. to 85° C., at which di-ammonium phosphate may be produced, bubbling the cooled gas through a phosphoric acid bath having a pH of about 5.0 to 6.5 but preferably 5.5 to 6.0 and maintained in a saturator at about the temperature at which said gas enters the saturator, withdrawing the hot devil gases arising from said bath from the saturator, cooling such gases and thereby condensing at least a part of the water vapor in such gases and withdrawing the condensate from the system, reheating a proportion of the said withdrawn and cooled gases and returning or recycling it to the saturator at a temperature approximately the same as that at which the original gases entered the saturator, e.g., between 65° C. and 85° C., such gases being introduced below the level of the solution therein and being bubbled through the said bath thereby to evaporate from the latter excess water added to the system during the di-ammonium phosphate crystallizing operation, and withdrawing the crystals from the saturator for further treatment, e.g., in a separator, centrifuge, and dryer.

It has been found that a temperature of 80° C. and a pH of 5.5 are very satisfactory for the said phosphoric acid bath.

The cooling of the ammonia containing vapors passed from the still to the saturator may be effected by a water cooled dephlegmator arranged in the vapor line between the ammonia still and the saturator or by a feed of cold ammoniacal liquor to the head of the still. The temperature of the vapors or gases passing to the saturator are thus controlled by the temperature and flow rate of the cooling water to the dephlegmator or by the cold ammoniacal liquor.

The condensates produced by cooling the gases, for example in the dephlegmator, leaving the top of the ammonia still on their way to the saturator, are preferably returned to the top of the ammonia still.

Preferably the cold ammoniacal liquor entering the system is used for effecting through the medium of heat exchange apparatus a preliminary cooling of the gases and vapors withdrawn from the saturator, such withdrawn gases and vapors being further cooled if required further to condense the water vapor and to reduce them to a suitable temperature for disposal. This further cooling may conveniently be effected by cooling water in indirect tubular coolers.

The withdrawal of the gases may be effected by means of an appropriate fan following the indirect tubular coolers, the cooler gases then being divided into two streams, one for disposal and the other for return or recycling to the saturator. The proportion of reheated gas (unsaturated with water) returned or recycled to the saturator will depend on its temperature and the quantity of water to be evaporated from the solution in the saturator in order to maintain the concentration of the solution at the correct value to produce efficient crystallization, and to prevent overfilling of the saturator with water.

The gases returned or recycled to the saturator may be discharged into the latter by a spray ring or the like submerged below the surface of the liquid in the saturator or they may merely be added to the main ammonia vapor supply line to the saturator at a position between the latter and the said dephlegmator or cooling means where such is provided. These gases not only evaporate excess water in the phosphoric acid bath, but serve to agitate the crystals in the saturator and promote the growth of the crystals by maintaining the smaller crystals in suspension so as to prevent them from being withdrawn from the saturator until they have grown sufficiently.

Preferably, the initial cooling of the effluent gases withdrawn from the saturator by the incoming ammoniacal liquor is supplemented by the said subsequent water cooling to reduce the temperature of effluent gases to about 25° C.; the proportion of these effluent gases returned or recycled to the saturator being reheated to between about 65° C. and 85° C. To effect the reheating of the gases to be returned or recycled to and bubbled through the solution in the saturator to the appropriate temperature conveniently ranging between about 65° C. to 85° C. and preferably about 80° C., reheating means in the form of a heater or a heat exchanger which may be conveniently heated by, for example, steam. The heat exchanger is provided in the circuit of the returned or recycled gases. If desired, the hot effluent withdrawn from the still may be used in addition or alone for reheating the recycled gas.

The di-ammonium phosphate crystals may be extracted from the saturator by an air-ejector or pump, and the centrifuging and final drying of the crystals may be effected in a centrifugal machine and an air-heated dryer, the temperature during these operations being maintained below a maximum of about 85° C. and preferably not exceeding 80° C.

Should there be any traces or slip of ammonia passing through the phosphoric acid bath in a quantity considered worth while recovering, then because there is an indirect system of recovery of the ammonia, any such traces or slip of ammonia may be recovered by returning the devil gases to the gas stream before the latter enters the ammonia washer, thereby avoiding or reducing the loss of ammonia gas.

According to a still further aspect of the invention, there is provided apparatus for carrying out the process, such apparatus comprising an ammonia still for distilling ammoniacal liquor, means for cooling the gas thus produced, a saturator, means for passing the cooled gas through a phosphoric acid bath in the said saturator, means for withdrawing the hot gases arising from the said bath and cooling them to condense at least a part of the water vapor in such gases, means for reheating at least a portion of the withdrawn gases and means for introducing such portion of the gases below the level of a solution in the saturator.

In order that the invention may be more readily understood, three embodiments of the process for producing di-ammonium phosphate will now be described by way of example and with reference to the accompanying drawings, in which:

FIG. 3 illustrates diagrammatically a third embodiment of the process of the invention.

Figure 1:
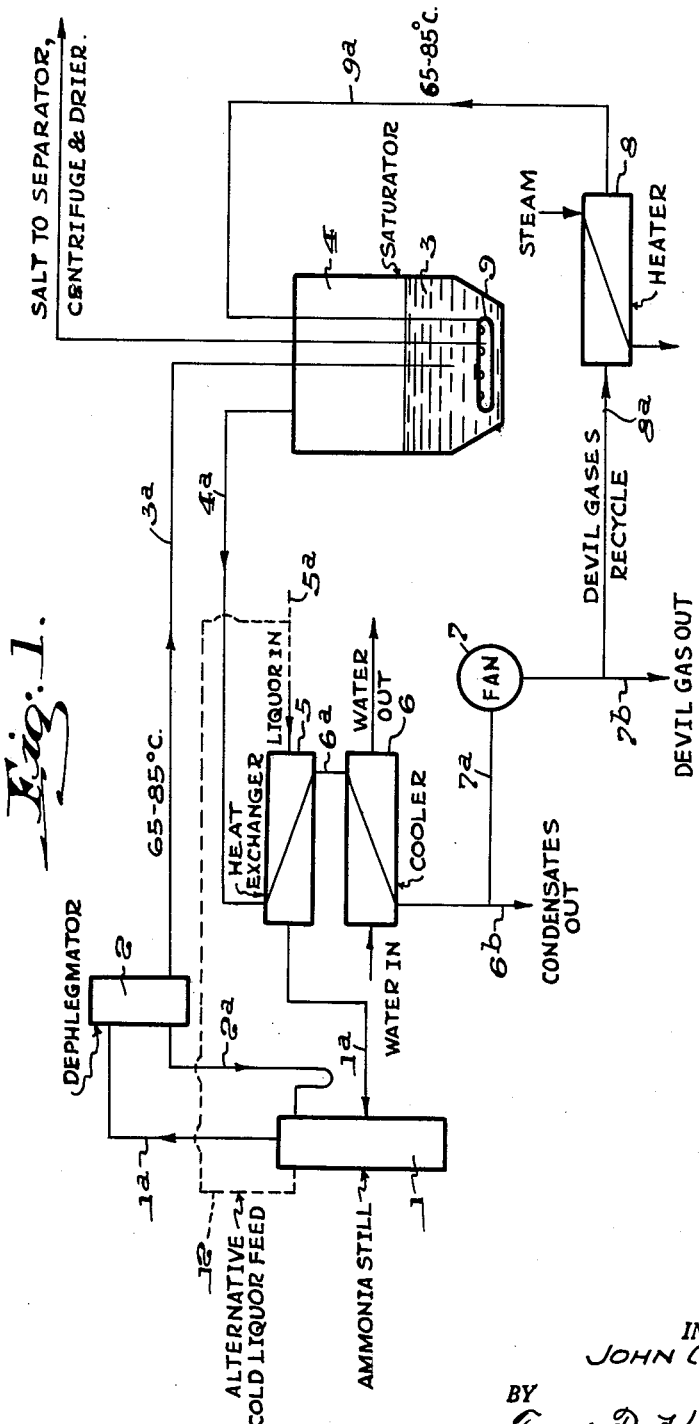
FIG. 1 illustrates diagrammatically one embodiment of the process of the invention.

As illustrated in FIG. 1, the first embodiment of the process comprises distilling ammoniacal liquor introduced through line 1a in an ammonia still 1, the ammonia containing vapors being cooled from a temperature of about 105° C. to a temperature in the region of about 65-85° C. by being passed by way of line 1a through a water-cooled dephlegmator 2. The condensates from the dephlegmator 2 are returned through lines 2a to the top of the ammonia still 1.

The cooled gas is then passed by line 3a and bubbled through a phosphoric acid bath 3 having a pH of about 5.5 to 6.0 and maintained in a staurator 4 at about the temperature at which the gas enters the saturator. Di-ammonium phosphate crystals are produced in the saturator 4.

The devil gases, air and water arising from the phosphoric acid bath 3 are withdrawn from the saturator 4 by way of line 4a and are passed through a heat exchanger 5 where a preliminary cooling of the gases and vapors is effected by heat exchange with the cold ammoniacal liquor entering the system through line 5a. The devil gases, air and water leave the heat exchanger 5 by way of line 6a and are further cooled by cooling water in an indirect tubular cooler 6, and the condensates from the cooler 6 are withdrawn for disposal through line 6b.

The withdrawal of the gases from the cooler through line 7a is effected by means of a fan 7, the cooled gases then being divided into two streams, one for disposal through line 7b and the other through line 8a for return of recycling to the saturator 4.

The proportion of gases returned or recycled to the saturator 4 will depend on its temperature and the quantity of water to be evaporated from the solution in the saturator 4 in order to maintain the concentration of the solution at the correct value to produce efficient crystallization, and to prevent overfilling of the saturator 4 with water.

The stream of gases returned or recycled to the saturator 4 through line 8a is heated to a temperature of about 65° C.–85° C. by a steam heater 8, and is then discharged into the saturator 4 through line 9a by a spray ring 9 submerged below the surface of the liquid in the saturator. The returned or recycled gases serve not only to evaporate excess water in the phosphoric acid bath 3 in the saturator 4 but also serve to agitate the crystals in the saturator and promote the growth of the crystals in suspension until they have grown sufficiently.

Di-ammonium phosphate crystals are extracted from the saturator 4 by an air ejector or pump (not shown), and the crystals are then further treated in a separator, centrifuge, and drier (not shown).

In a modification of this first embodiment, the cooling of the ammonia containing vapors passed from the still 1 to the saturator 4 is assisted or effected solely by a feed of cold ammoniacal liquor through line 12 to the head of the still 1 as indicated in broken lines.

Figure 2:
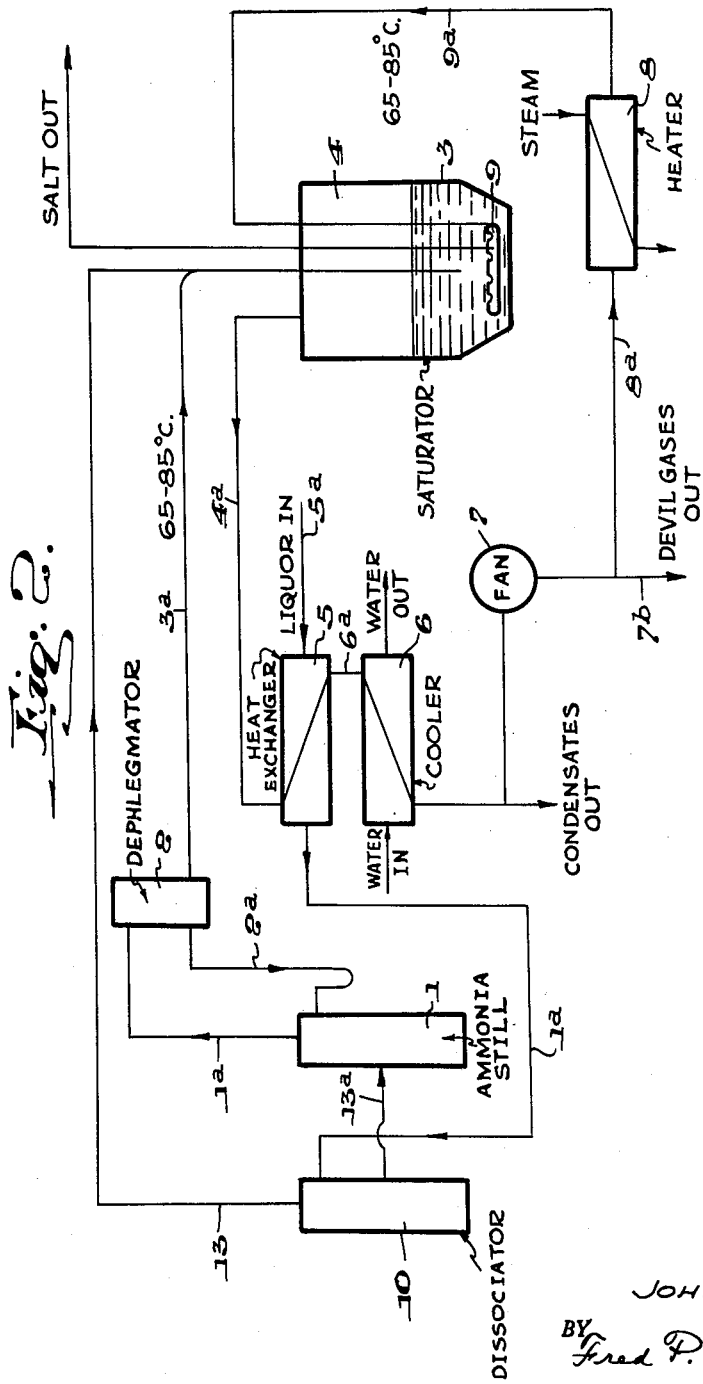
FIG. 2 illustrates diagrammatically a second embodiment of the process of the invention.

The second embodiment of the process illustrated in FIG. 2 is similar to that described in connection with FIG. 1 but, in the second embodiment, a dissociator 10 precedes the ammonia still 1 so that a preliminary extraction of hydrogen sulphide and carbon dioxide and other obnoxious gases from the ammonical liquor may be affected before the liquor passes through line 13a into the still 1 and the dephlegmator 2. The gases removed from the liquor by the dissociator 10 are fed through line 13 into the saturator 4 with the gases leaving the dephlegmator 2. The ammoniacal liquor from the dissociator 10 is introduced into the still 1 by way of line 13a.

The third embodiment of the process illustrated in FIG. 3 is also similar to that described in connection with FIG. 1, but in the third embodiment, the hot effluent withdrawn from the still 1 through line 1c is used for reheating the gas to be recycled, the reheating being effected in a heat exchanger 11. The devil gases are recycled to the saturator 4 by line 11a.

What is claimed is:

1. In a process for producing di-ammonium phosphate from ammoniacal liquor recovered from a gas evolved from the carbonization of coal and in which said liquor includes devil gases, comprised of hydrogen sulphide, hydrocyanic gas and carbon dioxide, dissolved therein, comprising distilling said ammoniacal liquor and said devil gases from said liquor so as to form vapors thereof, cooling said vapors to a temperature ranging between about 65° C. to 85° C. at which said di-ammonium phosphate is produced, passing said cooled vapors through a phosphoric acid bath having a pH of about 5.0 to 6.5 and maintained within a said temperature range at which said gas enters said bath, withdrawing the hot devil gases arising from said bath, cooling said devil gases so as to condense at least a portion of the water vapor in said gases, separating said condensed portion of said water vapor from said devil gas, reheating the remaining portion of the said cooled devil gases, recycling said reheated devil gases to said bath at a temperature approximately the same as that at which said ammonia vapors and devil gases initially entered said bath so as to remove excess water from said bath thereby maintaining the concentration of said bath substantially constant, and withdrawing di-ammonium phosphate crystals from said bath.

2. The process as defined in claim 1, wherein said phosphoric acid is maintained at a temperature of 80° C. and a pH of 5.5.

3. The process as defined in claim 1 wherein said ammoniacal liquor is employed to effect initial cooling of said devil gases withdrawn from said bath.

4. The process as defined in claim 1 wherein the effluent recovered during said distilling of said ammoniacal liquor is employed for reheating said withdrawn devil gases.

5. The process as defined in claim 1 wherein the devil gases are extracted from said ammoniacal liquor prior to distilling the later, and said devil gases are passed through said bath.

References Cited in the file of this patent
UNITED STATES PATENTS

| | | |
|---|---|---|
| 2,033,389 | Moose | Mar. 10, 1936 |
| 2,040,563 | Phillips | May 12, 1936 |
| 2,849,288 | Langguth | Aug. 26, 1958 |
| 2,970,888 | Helm et al. | Feb. 7, 1961 |